United States Patent Office 3,015,033
Patented Dec. 26, 1961

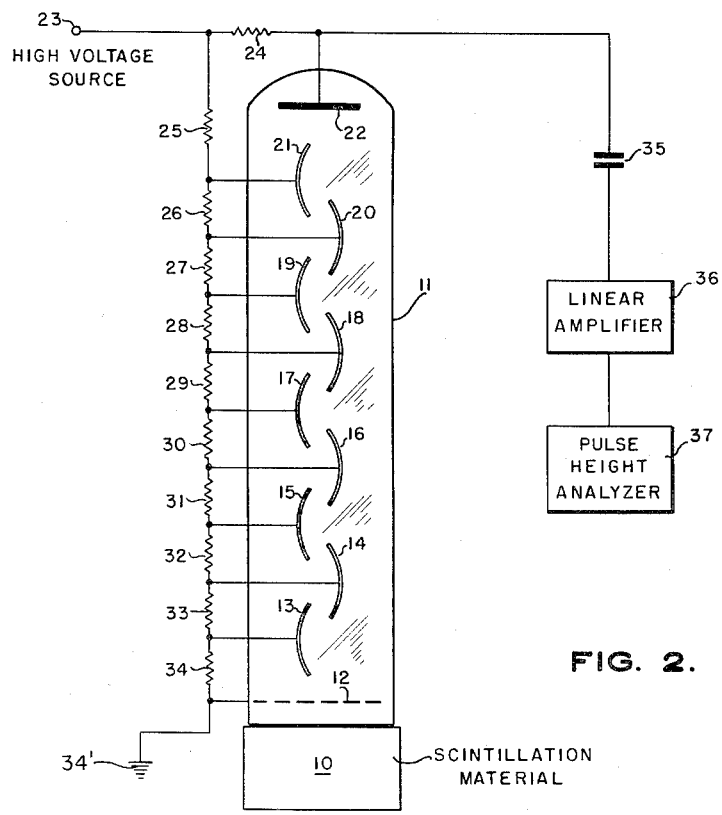
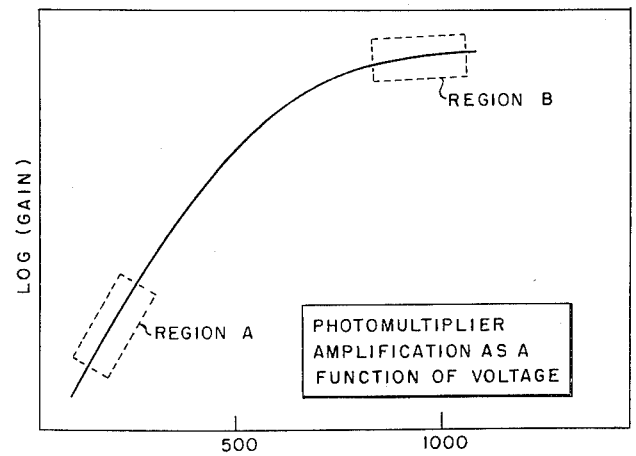
FIG. 2.
FIG. 1.

3,015,033
METHOD FOR IMPROVING GAIN STABILITY OF PHOTOMULTIPLIER TUBES
Nils L. Muench, Houston, Tex., assignor, by mesne assignments, to Jersey Production Research Company, Tulsa, Okla., a corporation of Delaware
Filed Apr. 15, 1957, Ser. No. 652,889
2 Claims. (Cl. 250—207)

This invention concerns a method for improving gain stability of electron multipliers such as photomultiplier tubes.

More specifically the invention concerns increasing voltage across one or several dynode stages of an electron multiplier and decreasing the voltage across the remaining dynode stages in order to maintain the overall gain constant.

A high degree of gain stability is required in many electron multiplier applications, as for example, in a gamma ray scintillation spectrometer. In such spectrometers a phosphor detecting element is utilized to convert incoming short wave length radiation into longer wave length radiation, which latter type of radiation will hereinafter be referred to as light. Thus, in traversing the scintillation phosphor, the incoming radiation to be detected loses its energy in exciting and ionizing the molecules of the phosphor. These molecules then radiate energy in the form of light, some of which is collected on the photocathode of a photomultiplier tube and forms photoelectrons which are amplified by the dynode stages of the photomultiplier tube. The output signals of the photomultiplier tube are then analyzed. Hence, since the pulses analyzed should be proportional to the energy and intensity of the incoming radiation, the gain should be maintained as low as possible.

The gain of photomultiplier tubes as usually operated depends critically on the voltage supplied to the photomultiplier. For example, if a Dumont #6292 tube is operated at 1000 volts, a 1% change in this voltage produces a 7% change in overall gain.

Therefore, an object of this invention is to improve gain stability in electron multipliers.

Briefly, the invention comprises a method for improving gain stability of an electron multiplier having a plurality of dynode stages and operated at a selected voltage comprising maintaining non-uniform voltage distribution among said plurality of dynode stages.

For a more detailed description of the operation of the invention, reference is made to the figures wherein:

FIG. 1 is a plot showing photomultiplier amplification as a function of voltage; and FIG. 2 is a schematic illustration of a general circuit according to the invention.

Gain stability with respect to voltage changes is increased or improved depending on the relation between gain and voltage for both very high and very low voltage. Thus, referring to FIG. 1 wherein the logarithm of the photomultiplier gain is plotted versus voltage per dynode stage. In region "A," the logarithm of the photomultiplier gain equals $C_1V + C_2$, where V is voltage per stage and $C_1$ and $C_2$ are constants. Then by letting gain be denoted by $\phi$ the equation (1) $$\phi = e^{C_2 + C_1 V}$$

is obtained. Then differentiating gain with respect to voltage the equation (2) $$\frac{d\phi}{dV} = C_1 \phi$$

results. However, since fractional changes are of primary interest by dividing through Equation 2 by the reciprocal of gain with respect to the reciprocal of voltage the equation (3) $$\frac{\frac{1}{\phi} \frac{d\phi}{dV}}{\frac{1}{V}} = C_1 \phi \frac{V}{\phi} = C_1 V$$

results.

Thus, the fractional change in gain $\phi$, given by $$\frac{d\phi}{\phi}$$

divided by the fractional change in voltage V, given by $$\frac{dV}{V}$$

increases linearly with voltage in region "A." It is in this region that an electron multiplier is normally operated. Hence to reduce the dependence of gain on voltage in region "A," the voltage per stage should be reduced.

If the voltage is increased sufficiently a flat plateau, indicated in FIG. 1 as region "B," is reached. In this region gain is independent of voltage.

Therefore, in order to improve the gain stability of electron multipliers the voltage of one or several stages is increased in order that the plateau of operating region "B" is reached. As shown, the gain of these stages is independent of voltage. Since large amplification is obtained from the stages operated in region "B," the remaining stages operated in region "A" may be reduced in voltage so as to maintain overall voltage and overall amplification constant. The reduction of voltage for the stages in region "A" effects a further stabilization, and the dependence of electron multiplier gain on voltage can be reduced significantly.

Reference is now made to FIG. 2 to illustrate an example of the operation of the invention.

In FIG. 2 is shown a scintillating crystal 10 positioned adjacent a photomultiplier tube generally designated 11. The photomultiplier tube 11 is provided with a photocathode 12 and a plurality of dynodes 13 through 22. Each of the dynodes is maintained at a higher potential then the next preceeding one (and the photocathode) by means of a voltage divider circuit including a high voltage source 23 in series with a plurality of resistors 24 through 34 grounded as at 34'.

The output anode 22 of the photomultiplier may be connected in series to a condenser 35, a linear amplifier 36 and a pulse height analyzer 37, which latter may include a discriminator or integrator and a recorder or other pulse analyzing means.

In usual operation approximately 100 volts is applied between each dynode stage and approximately twice this voltage between photocathode 12 and the first dynode 13. The voltage between anode 22 and the last dynode 21 is any voltage greater than 50 volts.

By the method of the invention described herein the voltage of one or more of the stages including the stage between the photocathode 12 and first dynode 13, such as the stages between dynodes 13, 14 and 14, 15 etc. may be increased sufficiently to reach the plateau of operating region "B" shown in FIG. 1, wherein the gain is independent of voltage. The remaining stages such as 18, 19, and 20, 21 etc. are then reduced in voltage so as to maintain the overall voltage constant. For example, the voltage on dynode 21 may be increased from 150 volts to 1,000 volts and the voltage on dynodes 20, 19, 18 etc. reduced from 150 volts to 30 volts, respectively.

Having fully described the objects, operation and elements of my invention, I claim:

1. A method for improving gain stability of an electron multiplier having a plurality of dynode stages and being operated at a fixed total voltage comprising the steps of increasing the voltage across at least one dynode stage from the relatively low voltage per stage when the multiplier is operated in its usual manner to a relatively high voltage which is sufficiently high to make the gain across said stage substantially independent of voltage fluctuations and decreasing the voltage across said remaining dynode stages from the relatively low voltage per stage when the multiplier is operated in its usual manner an amount such that the total voltage remains fixed.

2. A method for improving gain stability of an electron multiplier having a plurality of dynode stages comprising the steps of increasing the voltage across at least one dynode stage from the relatively low voltage per stage when the multiplier is operated in its usual manner an amount sufficient to make the ratio of secondary electrons emitted from, to primary electrons impinging on, the second dynode of said dynode stage independent of voltage fluctuations, said gain being maintained substantially equal to the gain when the multiplier is operated in its usual manner at relatively low voltage per stage, and decreasing the voltage across said remaining dynode stages from the relatively low voltage per stage when the multiplier is operated in its usual manner an amount such that the total voltage remains fixed.

References Cited in the file of this patent

UNITED STATES PATENTS

| | | |
|---|---|---|
| 2,686,266 | Pringle et al. | Aug. 10, 1954 |
| 2,728,863 | Goodyear | Dec. 27, 1955 |
| 2,796,531 | Goodale | June 18, 1957 |
| 2,798,165 | Neher | July 2, 1957 |
| 2,807,723 | Singer et al. | Sept. 24, 1957 |
| 2,889,461 | Harrington | June 2, 1959 |
| 2,903,595 | Morton | Sept. 8, 1959 |

OTHER REFERENCES

"Multiplier Phototubes," April 1955, page 6, column 2, published by Allen B. Dumont Lab., Inc., Clifton, New Jersey.

"The Oscillographer," April-June 1954, page 10, Fig. 12, published by Allen B. Dumont Lab., Inc., Instrument Div., Clifton, New Jersey.